(12) United States Patent
     Pursifull

(10) Patent No.: US 9,193,274 B2
(45) Date of Patent: Nov. 24, 2015

(54) BATTERY ELECTRIC VEHICLE JUMPER CABLE AND JUMP STARTING METHOD

(71) Applicant: FORD GLOBAL TECHNOLOGIES, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 197 days.

(21) Appl. No.: 13/942,012

(22) Filed: Jul. 15, 2013

(65) Prior Publication Data

US 2015/0015183 A1    Jan. 15, 2015

(51) Int. Cl.
*H02J 7/00* (2006.01)
*H01M 10/44* (2006.01)
*H01M 10/46* (2006.01)
*B60L 11/18* (2006.01)
*H02J 1/00* (2006.01)

(52) U.S. Cl.
CPC ......... *B60L 11/1816* (2013.01); *B60L 11/1846* (2013.01); *B60L 11/1861* (2013.01); *H02J 1/00* (2013.01); *H02J 7/0054* (2013.01); *H02J 2001/006* (2013.01)

(58) Field of Classification Search
CPC .... H02J 7/0054; H02J 7/0044; H01R 11/288; H01R 11/281
USPC .................................................. 320/103–105
See application file for complete search history.

(56) References Cited

U.S. PATENT DOCUMENTS 6,319,055 B1 *  11/2001  Conner, Jr. .................... 439/504
2012/0286720 A1 *  11/2012  Fassnacht et al. ............. 320/105

* cited by examiner

*Primary Examiner* — Nghia Doan
(74) *Attorney, Agent, or Firm* — David Kelley, Esq.; Tung & Associates

(57) ABSTRACT

A battery electric vehicle jumper cable includes a first battery electric vehicle electrical plug adapted for connection to a standard charging port interface on a first battery electric vehicle; a second battery electric vehicle electrical plug adapted for connection to a standard charging port interface on a second battery electric vehicle; and an electrical cable establishing electrical communication between the first battery electric vehicle electrical plug and the second battery electric vehicle electrical plug. An electrical power transfer system for battery electric vehicles and a battery electric vehicle jump starting method are also disclosed.

16 Claims, 2 Drawing Sheets

BATTERY ELECTRIC VEHICLE JUMPER CABLE AND JUMP STARTING METHOD

FIELD

Illustrative embodiments of the disclosure generally relate to battery electric vehicles (BEVs). More particularly, illustrative embodiments of the disclosure relate to a jumper cable for battery electric vehicles and a method of jump starting battery electric vehicles.

BACKGROUND

Under some circumstances, the batteries of both internal combustion-powered and electric-powered vehicles may become depleted of electrical charge, potentially leaving the automobiles stranded. Conventional internal combustion-powered vehicles can be "jump started" using a pair of jumper cables, in which the battery of a first vehicle which supplies the electrical charge is electrically connected to the depleted battery of a second vehicle. The first vehicle is turned on to deliver the electrical current to the battery of the second vehicle, during which the ignition of the second vehicle can be engaged to operate the vehicle.

A jumper cable for battery electric vehicles and a method of jump starting battery electric vehicles is needed.

SUMMARY

Illustrative embodiments of the disclosure are generally directed to a battery electric vehicle jumper cable for battery electric vehicles. An illustrative embodiment of the battery electric vehicle jumper cable includes a first battery electric vehicle electrical plug adapted for connection to a standard charging port interface on a first battery electric vehicle; a second battery electric vehicle electrical plug adapted for connection to a standard charging port interface on a second battery electric vehicle; and an electrical cable establishing electrical communication between the first battery electric vehicle electrical plug and the second battery electric vehicle electrical plug.

Illustrative embodiments of the disclosure are further generally directed to an electrical power transfer system for battery electric vehicles. An illustrative embodiment of the electrical power transfer system includes a battery pack of a first battery electric vehicle; a battery energy control module of the first battery electric vehicle interfacing with the battery pack of the first battery electric vehicle; a first charging port of the first battery electric vehicle interfacing with the battery energy control module of the first battery electric vehicle; a battery pack of a second battery electric vehicle; a battery energy control module of the second battery electric vehicle interfacing with the battery pack of the second battery electric vehicle; a second charging port of the second battery electric vehicle interfacing with the battery energy control module of the second battery electric vehicle; and a battery electric vehicle jumper cable establishing electrical communication between the first charging port of the first battery electric vehicle and the second charging port of the second battery electric vehicle. The battery energy control module of the first battery electric vehicle is configured to transfer electrical current from the first battery pack of the first battery electric vehicle to the second battery pack of the second battery electric vehicle through the battery electric vehicle jumper cable.

Illustrative embodiments of the disclosure are further generally directed to battery electric vehicle jump starting method. An illustrative embodiment of the battery electric vehicle jump starting method includes configuring a first battery electric vehicle to transfer electrical current to a second battery electric vehicle; inserting a first battery electric vehicle electrical plug of a battery electric vehicle jumper cable into a charging port of the first battery electric vehicle; inserting a second battery electric vehicle electrical plug of a battery electric vehicle jumper cable into a charging port of the second battery electric vehicle; and transferring electrical current from a battery pack of the first battery electric vehicle to a battery pack of the second battery electric vehicle through the battery electric vehicle jumper cable.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 1:
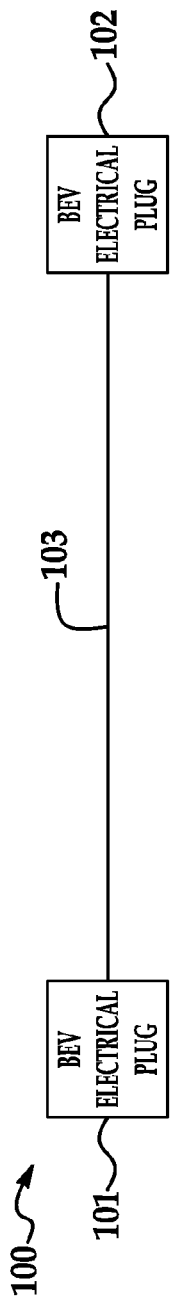
FIG. 1 is a block diagram of an illustrative embodiment of a BEV (Battery Electric Vehicle) jumper cable.
Figure 2:
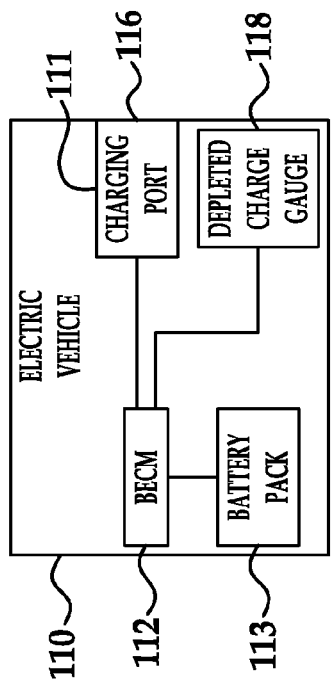
FIG. 2 is a block diagram of an exemplary battery electric vehicle configured for implementation of an illustrative embodiment of the BEV jumper cable and jump starting method.

Referring initially to FIGS. 1 and 2, an illustrative embodiment of the BEV jumper cable is generally indicated by reference numeral 100 in FIG. 1. An exemplary battery electric vehicle (BEV) 110 which is suitable for implementation of the BEV jumper cable 100 is shown in FIG. 2. The BEV 110 may be any type of EV (Electric Vehicle) or PHEV (Plug-In Hybrid Electric Vehicle) which utilizes at least one battery or battery pack and electric motor for vehicle conveyance. Non-limiting examples of commercially-available BEVs 110 which are suitable for implementation of the BEV jumper cable 100 include the FORD FOCUS (trademark) BEV, FORD TRANSIT (trademark) BEV and FORD C-MAX (trademark) PHEV (Plug In Hybrid Electric) vehicles. Generally, the BEV 110 may include a charging port 111. The charging port 111 may include an industry-standard BEV charging port interface 116 on the exterior surface of the BEV 110. A battery energy control module (BECM) 112 may interface with the charging port 111. A battery pack 113 may interface with the BECM 112. The battery pack 113 may include at least one battery (not shown) which supplies electrical power to an electric motor (not shown) which facilitates conveyance of the BEV 110 either alone or in combination with an internal combustion engine.

Throughout normal operation of the BEV 110, an electrical power source (not shown) is periodically connected to the charging port interface 116 of the charging port 111 to charge the battery pack 113 when the battery pack 113 is depleted or nears depletion of electrical power. The electrical power source may include a standard wall outlet or a power station which is equipped to charge BEVs, for example and without limitation. The electrical power source may be electrically connected to the charging port 111 through a connecting cord (not shown) which is fitted with an industry-standard connector that is compatible with the charging port interface 116 of the charging port 111, as is known by those skilled in the art. Accordingly, electrical current may flow from the electrical power source to the battery pack 113 through the charging port 111 and the BECM 112, respectively, to replenish or partially replenish the supply of electrical power in the battery pack 113. When charging of the battery pack 113 is complete, the charging port 111 is disconnected from the electrical power source. The charged battery pack 113 supplies electrical current for operation of the BEV 110 typically in the conventional manner. Electrical charge in the battery pack 113 may be periodically replenished in a similar manner.

The BEV jumper cable 100 may include a first BEV electrical plug 101 and a second BEV electrical plug 102. An electrical cable 103 may electrically connect the first BEV electrical plug 101 and the second BEV electrical plug 102. Each of the first BEV electrical plug 101 and the second BEV electrical plug 102 may include an industry-standard BEV electrical plug which is compatible for connection to the charging port interface 116 on the charging port 111 of the BEV 110. Accordingly, each of the first BEV electrical plug 101 and the second BEV electrical plug 102 of the BEV jumper cable 100 can be inserted in the companion charging port 116 of the BEV 110 typically in the conventional manner. The BECM 112 of the BEV 110 is configured to transfer electrical current from the battery pack 113 to the charging port 111 for transfer of electrical power between BEVs 110 through the BEV jumper cable 100, which will be hereinafter described.

In some embodiments, a depleted charge gauge 118 may interface with the BECM 112. The BECM 112 may be programmed to calculate the electrical charge which is obtained from the battery pack 113 of the BEV 110 that donates the electrical power and indicate the transferred electrical charge on the depleted charge gauge 118 in a selected metric such as cents and kilowatt hours, for example and without limitation. The depleted charge gauge 118 may be located on the vehicle dashboard (not shown) or other visible location inside or on the BEV 110.

Figure 3:
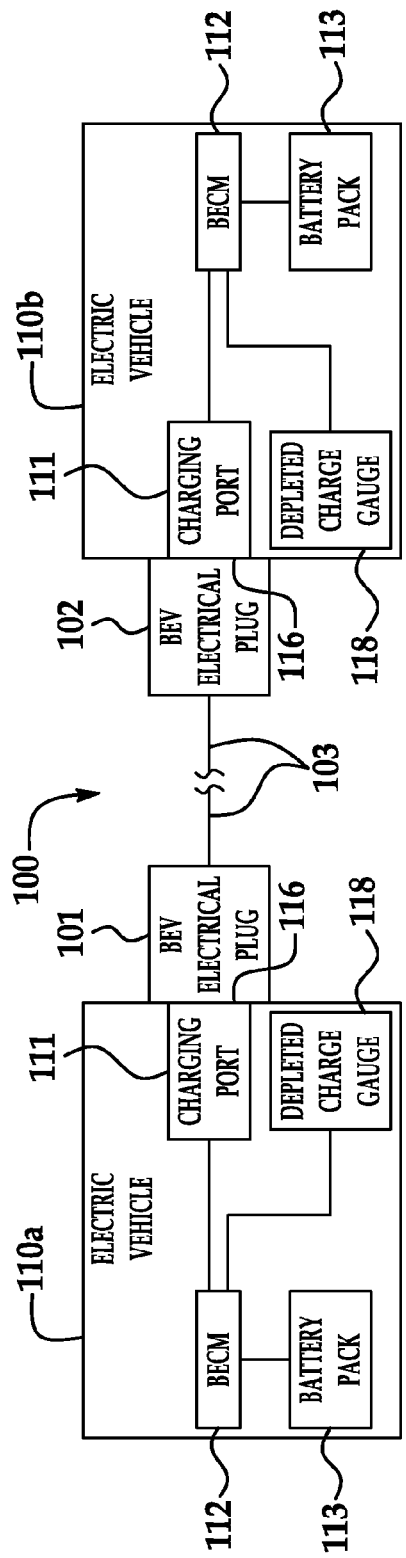
FIG. 3 is a block diagram of a pair of first and second battery electric vehicles with an illustrative BEV jumper cable connecting charging ports on the respective vehicles in implementation of an illustrative embodiment of the BEV jumper cable and jump starting method.

Referring next to FIG. 3, exemplary implementation of an illustrative embodiment of the BEV jumper cable 100 is shown. Accordingly, the BEV jumper cable 100 may be used to transfer electrical charge from the battery pack 113 of a first BEV 110a to the battery pack 113 of a second BEV 110b under circumstances in which the battery pack 113 of the second BEV 110b is depleted or nearly depleted. The first BEV electrical plug 101 of the BEV jumper cable 100 is inserted in the charging port interface 116 of the charging port 111 on the first BEV 110a. In like manner, the second BEV electrical plug 101 of the BEV jumper cable 100 is inserted in the charging port interface 116 of the charging port 111 on the second BEV 110b. The first BEV 110 is energized to facilitate flow of electrical current from the battery pack 113 through the charging port 111 of the first BEV 110, the first BEV electrical plug 101, the electrical cable 103, the second BEV electrical plug 102 and then the charging port 112 and the battery pack 113, respectively, of the second BEV 110b. Thus, the transferred electrical current replenishes or partially replenishes the electrical power which is stored in the battery pack 113 of the second BEV 110b so that the second BEV 110b can be driven to an electrical power source (not shown) for complete charging.

Throughout transfer of the electrical current, the operator (not shown) of the first BEV 110a may monitor the quantity of electrical power which is being transferred to the battery pack 113 of the second BEV 110b and terminate further flow of electrical power after a desired quantity of the electrical power has replenished the battery pack 113 of the second BEV 110b. Upon completion of the replenishment procedure, the first BEV electrical plug 101 and the second BEV electrical plug 102 of the BEV jumper cable 100 may be disconnected from the charging port 111 of the first BEV 110a and the charging port 111 of the second BEV 110b, respectively. The BEV jumper cable 100 may then be easily stored in the first BEV 110a or the second BEV 110b for subsequent use.

Figure 4:
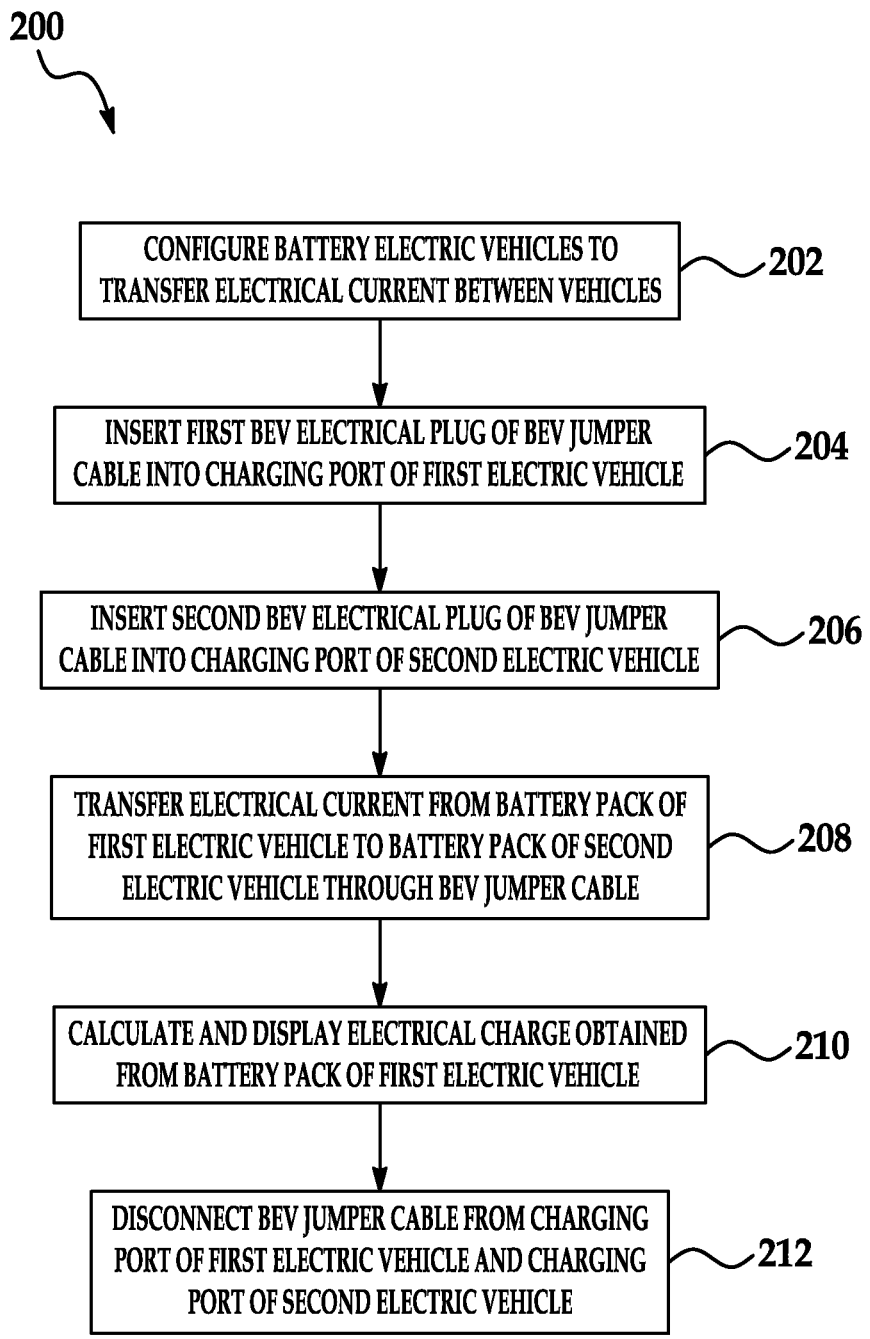
FIG. 4 is a flow diagram of an illustrative embodiment of a BEV jump starting method.

Referring next to FIG. 4, a flow diagram 200 of an illustrative embodiment of a BEV jump starting method is shown. In block 202, battery electric vehicles may be configured to transfer electrical current between the vehicles. In block 204, a first BEV electrical plug on a BEV jumper cable may be inserted into a charging port on a first BEV. In block 206, a second BEV electrical plug on the BEV jumper cable may be inserted into a charging port on a second BEV. In block 208, electrical current may be transferred from a battery pack of the first BEV to the battery pack of the second BEV through the BEV jumper cable to at least partially replenish the electrical power in the battery pack of the second BEV. In block 210, the electrical charge which is obtained from the battery pack of the first BEV may be calculated and displayed. In block 212, the BEV jumper cable may be disconnected from the charging port of the first BEV and the charging port of the second BEV.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A battery electric vehicle charge transfer system comprising:
   a first battery electric vehicle electrical plug configured to connect to a standard charging port interface on a first battery electric vehicle;
   a second battery electric vehicle electrical plug configured to connect to a standard charging port interface on a second battery electric vehicle;
   an electrical cable establishing electrical communication between the first battery electric vehicle electrical plug and the second battery electric vehicle electrical plug; and
   each of the electrical plugs further in electrical communication with a respective battery disposed on the first and second battery electric vehicles, at least one of the first and second battery electric vehicles configured to respectively calculate and display a quantity of electrical charge transferred by transferring electrical current between the first and second battery electric vehicles, the quantity of electrical charge transferred displayed in a selected metric corresponding to the quantity.

2. The battery electric vehicle jumper cable of claim 1 wherein each of the first battery electric vehicle electrical plug and the second battery electric vehicle electrical plug is configured to connect to a hybrid electric vehicle.

3. The system of claim 1 further comprising a charge transfer indicator disposed on at least one of the first and second battery electric vehicles, the charge transfer indicator configured to display the quantity of electrical charge transferred including during transfer of the electrical current.

4. The system of claim 1, further comprising at least one control module associated with at least one of the first and second battery electric vehicles, the at least one control module configured to transfer the electrical current through the respective control module to the respective battery.

5. An electrical power transfer system for battery electric vehicles, comprising:
 a battery pack of a first battery electric vehicle;
 a battery energy control module of the first battery electric vehicle interfacing with the battery pack of the first battery electric vehicle;
 a first charging port of the first battery electric vehicle interfacing with the battery energy control module of the first battery electric vehicle;
 a battery pack of a second battery electric vehicle;
 a battery energy control module of the second battery electric vehicle interfacing with the battery pack of the second battery electric vehicle;
 a second charging port of the second battery electric vehicle interfacing with the battery energy control module of the second battery electric vehicle;
 a battery electric vehicle jumper cable establishing electrical communication between the first charging port of the first battery electric vehicle and the second charging port of the second battery electric vehicle; and
 the battery energy control module of the first battery electric vehicle is configured to transfer electrical current from the first battery pack of the first battery electric vehicle to the second battery pack of the second battery electric vehicle through the battery electric vehicle jumper cable, at least one of the first and second battery electric vehicles configured to calculate and display a quantity of electrical charge transferred by the transferred electrical current, the quantity of electrical charge transferred displayed in a selected metric corresponding to the quantity.

6. The electrical power transfer system of claim 5 wherein the battery electric vehicle jumper cable comprises:
 a first battery electric vehicle electrical plug detachably connected to the first charging port of the first battery electric vehicle;
 a second battery electric vehicle electrical plug configured to connect to the second charging port of the second battery electric vehicle; and
 an electrical cable establishing electrical communication between the first battery electric vehicle electrical plug and the second battery electric vehicle electrical plug.

7. The electrical power transfer system of claim 5 further comprising a depleted charge gauge interfacing with the first battery energy control module of the first battery electric vehicle, the depleted charge gauge configured to indicate the electrical charge transferred from the battery pack of the first battery electric vehicle.

8. The system of claim 5 further comprising a charge transfer indicator associated with at least one of the first and second battery electric vehicles, the charge transfer indicator configured to display the quantity of electrical charge transferred.

9. The system of claim 5 wherein at least one of the first and second battery electric vehicles is configured to calculate and display the quantity of electrical charge transferred including during transfer of the electrical current.

10. The method of claim 5, further comprising at least one control module associated with at least one of the first and second battery electric vehicles, the at least one control module configured to transfer the electrical current through the respective control module to a respective battery pack.

11. A battery electric vehicle jump starting method, comprising:
 configuring a first battery electric vehicle to transfer electrical current to a second battery electric vehicle;
 inserting a first battery electric vehicle electrical plug of a battery electric vehicle jumper cable into a charging port of the first battery electric vehicle;
 inserting a second battery electric vehicle electrical plug of a battery electric vehicle jumper cable into a charging port of the second battery electric vehicle; and
 transferring electrical current from a battery pack of the first battery electric vehicle to a battery pack of the second battery electric vehicle through the battery electric vehicle jumper cable, the quantity of electrical charge transferred by the electrical current transfer; and
 calculating and displaying the quantity of electrical charge transferred, the quantity of electrical charge transferred displayed in a selected metric corresponding to the quantity.

12. The battery electric vehicle jump starting method of claim 11 further comprising monitoring the quantity of electrical charge transferred including during the electrical current transfer.

13. The method of claim 11 wherein further comprising displaying the quantity of electrical charge transferred on a charge transfer indicator associated with at least one of the first and second vehicles.

14. The method of claim 11 further comprising transferring the electrical current between the respective battery packs through a control module associated with at least one of the first and second vehicles.

15. The method of claim 11, further comprising determining a selected quantity of electrical charge transferred by monitoring the quantity of electrical charge transferred including during the electrical current transfer.

16. The method of claim 11, further comprising terminating transfer of the electric current in response to determining the quantity of electrical charge transferred.

* * * * *